United States Patent
Nádas et al.

(10) Patent No.: US 9,100,871 B2
(45) Date of Patent: Aug. 4, 2015

(54) HYBRID CONGESTION CONTROL

(75) Inventors: Szilveszter Nádas, Budapest (HU); Sándor Rácz, Cegléd (HU)

(73) Assignee: OPTIS CELLULAR TECHNOLOGY, LLC, Plano, TX (US)

( * ) Notice: Subject to any disclaimer, the term of this patent is extended or adjusted under 35 U.S.C. 154(b) by 118 days.

(21) Appl. No.: 14/004,403

(22) PCT Filed: Mar. 10, 2011

(86) PCT No.: PCT/SE2011/050263
§ 371 (c)(1),
(2), (4) Date: Sep. 10, 2013

(87) PCT Pub. No.: WO2012/121635
PCT Pub. Date: Sep. 13, 2012

(65) Prior Publication Data
US 2014/0003242 A1 Jan. 2, 2014

(51) Int. Cl.
*H04L 12/26* (2006.01)
*H04W 28/10* (2009.01)
*H04L 12/801* (2013.01)
(Continued)

(52) U.S. Cl.
CPC .............. *H04W 28/10* (2013.01); *H04L 47/12* (2013.01); *H04L 47/14* (2013.01); *H04L 47/17* (2013.01); *H04L 47/27* (2013.01); *H04L 47/32* (2013.01); *H04W 28/0247* (2013.01); *H04W 28/0284* (2013.01); *H04L 47/30* (2013.01); *H04L 47/31* (2013.01); *H04W 24/00* (2013.01); *H04W 28/0231* (2013.01); *H04W 28/22* (2013.01); *H04W 88/06* (2013.01)

(58) Field of Classification Search
None
See application file for complete search history.

(56) References Cited

U.S. PATENT DOCUMENTS 6,105,064 A * 8/2000 Davis et al. ................... 709/224
6,438,101 B1 * 8/2002 Kalampoukas et al. ...... 370/229
(Continued)

FOREIGN PATENT DOCUMENTS

| WO | WO-2011120581 (A1) | 10/2011 |
|----|---------------------|---------|
| WO | WO-2012057667 (A1) | 5/2012 |
| WO | WO-2012115545 (A1) | 8/2012 |

OTHER PUBLICATIONS

Extended European Search Report for PCT/SE2011/050263, dated Jan. 28, 2015, 7 pages.
(Continued)

*Primary Examiner* — Michael J Moore, Jr.
(74) *Attorney, Agent, or Firm* — Vincent J. Allen; Austin C. Teng; Carstens & Cahoon, LLP

(57) ABSTRACT

A multi-mode congestion control is employed in a transport network interconnecting a radio access node and a control node of a communication network. The transport network employs a window-based state providing a window-based congestion control mode for a data flow. This mode involves notifying an application level transport protocol implemented in a sending source of the communication network of any detected congestion event. If a congestion event in the transport network is detected a switch to a rate-based state is performed. The rate-based state provides a rate-based congestion control mode involving transmitting a rate-reducing message from the radio access node to the control node to trigger a reduction in the bitrate of the data flow in response to the detected congestion event.

22 Claims, 5 Drawing Sheets

(51) Int. Cl.
*H04L 12/807* (2013.01)
*H04L 12/823* (2013.01)
*H04L 12/835* (2013.01)
*H04L 12/833* (2013.01)
*H04W 24/00* (2009.01)
*H04W 28/02* (2009.01)
*H04W 28/22* (2009.01)
*H04W 88/06* (2009.01)

(56) References Cited

U.S. PATENT DOCUMENTS

| | | | |
|---|---|---|---|
| 6,842,424 B1* | 1/2005 | Key et al. | 370/236 |
| 7,054,317 B1 | 5/2006 | Jung et al. | |
| 2002/0181494 A1* | 12/2002 | Rhee | 370/465 |
| 2004/0174886 A1 | 9/2004 | Packer | |
| 2005/0226150 A1 | 10/2005 | Santos et al. | |
| 2006/0251010 A1* | 11/2006 | Ramakrishnan et al. | 370/328 |
| 2007/0177502 A1* | 8/2007 | Hama | 370/229 |
| 2008/0025216 A1* | 1/2008 | Singh et al. | 370/231 |
| 2010/0011270 A1* | 1/2010 | Yamamoto et al. | 714/748 |
| 2010/0182905 A1* | 7/2010 | Matsushita et al. | 370/232 |
| 2012/0039174 A1* | 2/2012 | Robin et al. | 370/235.1 |
| 2012/0063493 A1* | 3/2012 | Hasegawa et al. | 375/211 |

OTHER PUBLICATIONS

Nadas, Szilveszter, "Providing congestion control in the Iub Transport Network for HSDPA", Global Telecommunications Conference, 2007, pp. 5293-5297, XP031196931 (5 pages).

Border J, "Performance enhancing proxies intended to mitigate link-related degradations", Netwrok Working Group Request for Comments, 2001, pp. 1-40, XP002960550 (40 pages).

Pal L Palyi, "Window-based HSDPA Transport Network Congestion Control", Wireless Conference (EW), 2010, pp. 123-131, XP031688458 (10 pages).

Nadas, Szilveszter, "HSPA Transport Network Layer Congestion Control", Dept. of Telecommunications and Media Informatics, Budapest University of Technology and Economics, CH. 1, pp. 1-40, (43 pages).

International Search Report, Application No. PCT/SE2011/050263, Nov. 24, 2011, 3 pages.

* cited by examiner

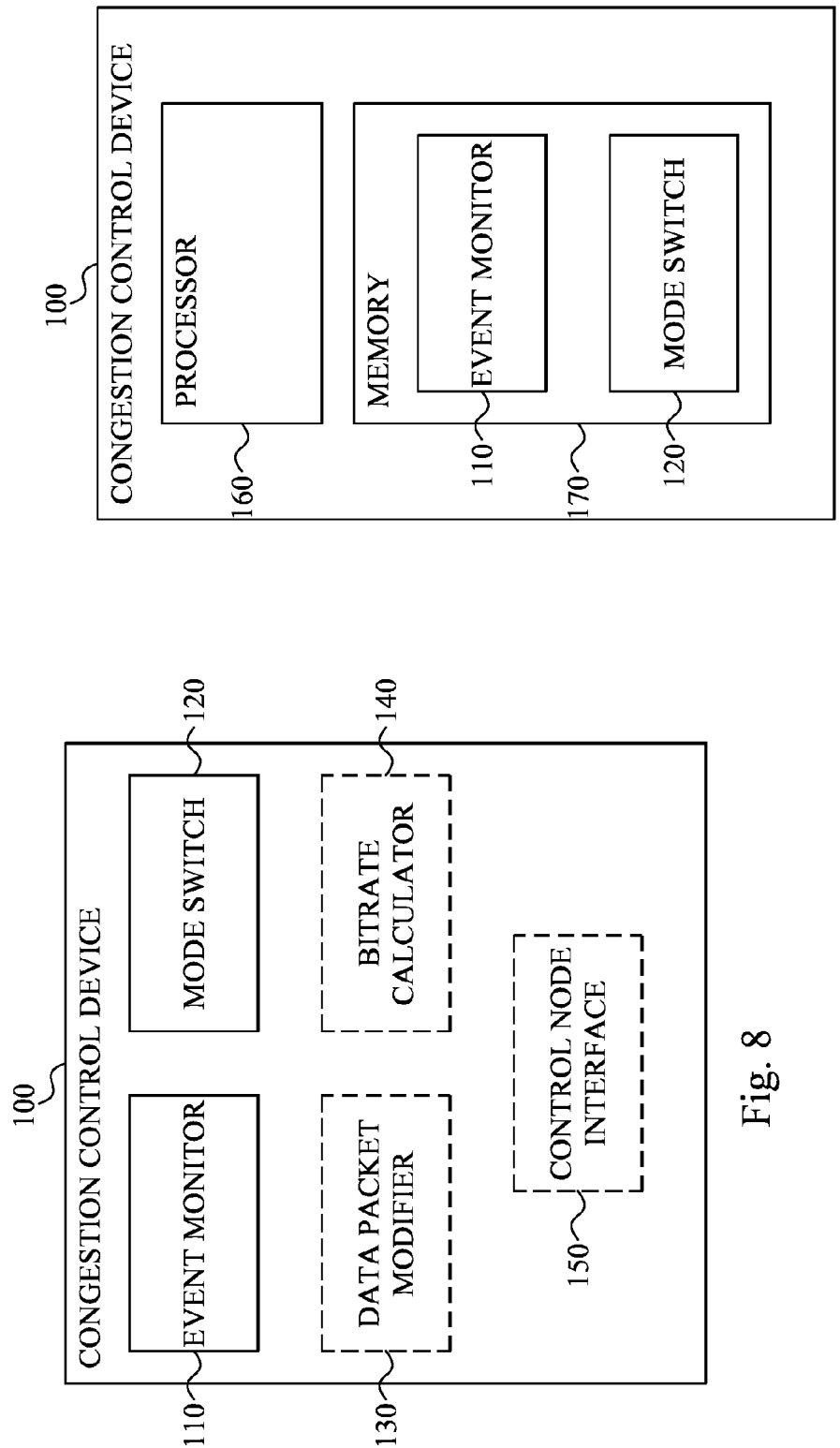

HYBRID CONGESTION CONTROL

CROSS-REFERENCE TO RELATED APPLICATION

This is a National stage of international Application No. PCT/SE2011/050263, filed Mar. 10, 2011, which is hereby incorporated by reference.

TECHNICAL FIELD

The present embodiments generally relate to congestion control in a communication network, and in particular to a hybrid or multi-mode congestion control.

BACKGROUND

In radio-based communication networks, intermediate transport networks may be used to convey data between different nodes of the communication network. One example of such a scenario occurs when using high speed packet access (HSPA). Here, a transport network (TN), also referred to as Iub transport network, may be used in the universal mobile telecommunications system (UMTS) terrestrial radio access network (UTRAN) to couple a radio network controller (RNC) to a radio access node, also referred to as radio base station (RBS) or Node B. HSPA in the direction from the communication network towards user equipment (UE) is referred to as high speed downlink packet access (HSDPA), and HSPA in the direction from the UE to the communication network is referred to as high speed uplink packet access (HSUPA).

According to HSPA, two levels of link layer retransmission protocols are used: hybrid automatic repeat request (HARQ) between the UE and the Node B, and radio link control (RLC) between the UE and the RNC. A flow control protocol, also referred to as framing protocol (FP), has been introduced to control the sending rate of the RNC in the downlink direction and the sending rate of the Node B in the uplink direction. The FP needs to address congestions on the radio link between the Node B the UE and congestions in the transport network between the RNC and the Node B, and will try to set an optimal sending rate which is as high as possible while avoiding the above mentioned types of congestion. This means that the FP attempts to control the sending rate in such a way that the fill level of queues in subsequent nodes will not exceed respective threshold sizes. HSDPA/HSUPA Handbook, Edited by Borko Furht and Syed A. Ahson, CRC Press, October 2010, Chapter 9—HSPA Transport Network Layer Congestion Control provides further information of the congestion control applicable to HSDPA and HSUPA.

However, it has turned out that the above-mentioned optimal sending rate is typically hard to achieve using the known FP. Further, typical scenarios of using HSPA involve, e.g. a rapidly changing radio capacity available to a certain RLC connections or different Iub transport network deployments with different RLC round trip delays. This may result either in the sending rate being set too low or in congestions not being avoided. Both adversely affect the end-to-end performance, e.g. measured in terms of throughput.

Moreover, the known FP handles all RLC connections in the same manner. This may result in that the end-to-end performance experienced by a high-priority service or user will suffer from congestions in the Iub transport network caused by RLC connections related to a low-priority service or user. The FP in HSDPA may also be configured to target fair bandwidth sharing among users or the target bitrate may be coupled to a user class so that some users get e.g. twice as much throughput as other users. In order to achieve this behavior, the HSDPA FP entity in the Node B scales the target bit rates for each flow or user so that they match the desired relative bit rates. However, this still does not solve the above-mentioned problems of adapting the sending rate.

SUMMARY

It is a general objective to provide an efficient solution to handling various congestion events that can occur in a communication network.

It is a particular objective to provide a congestion control that can efficiently handle both congestion events occurring in a transport network of the communication network and congestion events occurring on the air interface towards connected user equipment.

These and other objectives are met by embodiments as disclosed herein.

An aspect of the embodiments relates to a method for congestion control in a communication network comprising a transport network interconnecting a radio access node and a control node. The method involves monitoring for any congestion event in the transport network. If such a congestion event is detected in the transport network the method switches from a window-based state to a rate-based state for a data flow carrying data from the control node to the radio access node for transmission to at least one user equipment. The window-based state provides a window-based congestion control mode that involves notifying an application level transport protocol implemented in a sending source of the data flow of any congestion event. The application level transport protocol in the sending source will then take actions to solve the detected congestion event. The rate-based state, however, provides a rate-based congestion control mode that involves transmitting a rate-reducing message from the radio access node to the control node. The rate-reducing message will trigger a reduction in the bitrate of the data flow towards the radio access node and thereby contributes to solving the congestion event detected in the transport network.

Another aspect of the embodiments defines a congestion control device comprising an event monitor configured to monitor for any congestion event in the transport network. Once the event monitor detects such a congestion event in the transport network, a mode switch of the congestion control device switches from the window-based state providing the window-based congestion control mode to the rate-based state providing the rate-based congestion control mode.

Further aspects of the embodiments relate to a computer program product comprising computer program code means for executing the method for congestion control and a computer readable medium having stored thereon such a computer program product. Another aspect of the embodiments is a radio access node comprising the congestion control device.

The embodiments employ a multi-mode congestion control to efficiently handle various types of congestion events occurring in a communication network. As a consequence, each such congestion event will be resolved in the most appropriate manner and still enables a fair share of the available bandwidth among the active data flows and user equipment irrespective of whether the congestion event occurs in the transport network or in the air interface between the radio access node and the user equipment.

BRIEF DESCRIPTION OF THE DRAWINGS

The invention, together with further objects and advantages thereof, may best be understood by making reference to the following description taken together with the accompanying drawings, in which:

FIG. 8 is a schematic block diagram illustrating an embodiment of a congestion control device;

FIG. 9 illustrates an implementation example of a congestion control device according to an embodiment.

DETAILED DESCRIPTION

Throughout the drawings, the same reference numbers are used for similar or corresponding elements.

The present embodiments generally relate to congestion control in a communication network and in particular to a so-called hybrid or multi-mode congestion control enabling a switch between different congestion control modes providing different mechanisms of solving congestion events.

The multi-mode congestion control enables fairness among the active data flows irrespective of where in the communication network the congestion event occurs. Thus, the multi-mode congestion control of the embodiments can effectively handle both congestion events occurring in the transport network of the communication network and congestion events occurring in the air interface between connected user equipment and the radio access nodes of the communication network. The prior art congestion control as disclosed in the previously mentioned HSDPA/HSUPA Handbook may have efficiency problems when it comes to congestion events on the air interface due to a very fast variation in air interface capacity. The multi-mode congestion control of the embodiments does not only efficiently handle congestion control in the transport network but is also efficient for congestion control on the air interface.

The embodiments can be applied to any communication network, in particular radio-based communication networks, and is particularly suitable for handling congestion events occurring for downlink data flows. A non-limiting but particular example of such a radio-based communication network is a mobile communication network implementing high speed packet access (HSPA) and in particular high speed downlink packet access (HSDPA). The universal mobile telecommunications system (UMTS) is an example of such a mobile communication network.

Figure 1:
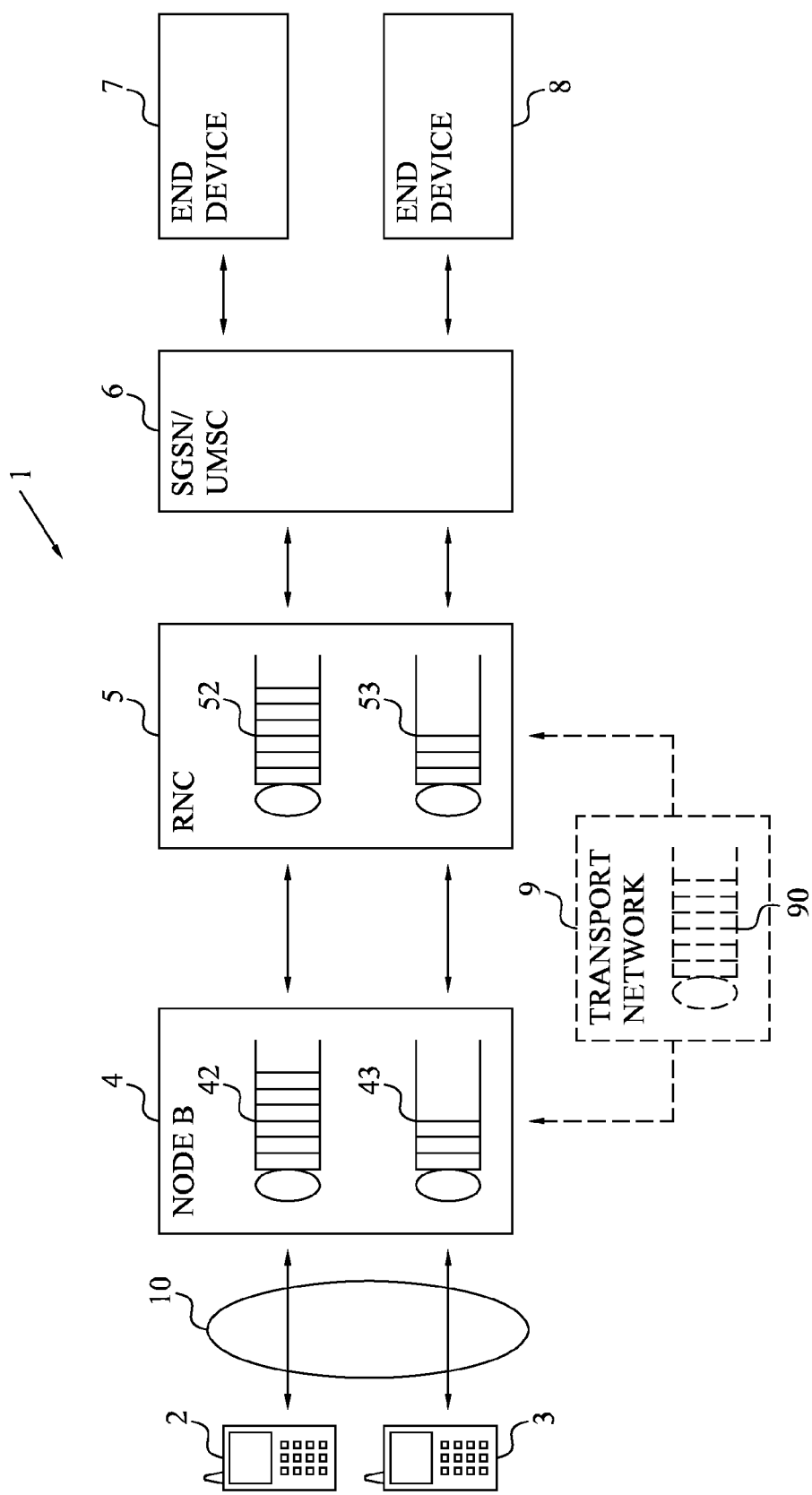
FIG. 1 is a schematic overview of a portion of a communication network according to an embodiment.

FIG. 1 is an illustration of a portion communication network 1 to which the congestion control of the embodiments can be applied. The communication network 1, such as exemplified by UMTS, comprises a control node 5 coupled via a transport network 9 to a radio access node 4 in order to convey data packets from end devices 7, 8 to user equipment 2, 3 connected to the radio access node 4 via a respective radio link 10. With an UMTS implementation, the transport network 9 is UMTS terrestrial radio access network (UTRAN) or Iub transport network 9 interconnecting a radio network controller (RNC) 5 with a Node B 4 as implementation examples of the control node 5 and the radio access node 4. HSPA in the direction from the communication network 1 to user equipment (UE) 2, 3 is referred to as high speed downlink packet access (HSDPA), and HSPA in the direction from the UE 2, 3 to the communication network 1 is referred to as high speed uplink packet access (HSUPA).

An end device 7, 8 can be any device that provides data to be transmitted over the communication network 1 to one or more user equipment 2, 3. Non-limiting examples of such devices include servers, remote terminals and devices, and other user equipment.

In a particular embodiment, in particular for a UMTS implementation, the communication network 1 can comprise at least one further control node 6 interconnecting the RNC 5 to the end devices 7, 8. This further control node 6 can be implemented as a serving general packet radio service support node (SGSN) or UMTS mobile switching centre (UMSC).

Different protocols or protocol layers may be used to convey data packets between the end devices 7, 8 and the user equipment 2, 3. For instance, an end-to-end application level protocol is typically implemented between the end devices 7, 8 and the user equipment 2, 3, a retransmission protocol could be implemented between the control node 5 and the user equipment 2, 3, such as radio link control (RLC), and between the radio access node 4 and the user equipment 2, 3, such as hybrid automatic repeat request (HARQ), and a flow control protocol is implemented between the control node 5 and the radio access node 2. The end-to-end protocol is a high layer protocol and, in an illustrated example, may be the transport control protocol/internet protocol (TCP/IP). Other protocol types may be used as well or as alternatives, such as user datagram protocol (UDP) together with the real-time protocol (RTP) and/or its counterpart, the real-time control protocol (RTCP) to control the data rate.

The retransmission protocol is a lower layer protocol, such as a link layer protocol. According to the retransmission protocol, data packets which were not successfully received are retransmitted, which involves some type of feedback mechanism from the retransmission protocol receiver to the retransmission protocol sender, for instance by sending acknowledgement/non-acknowledgement (ACK/NACK) feedback from the receiver to the sender.

The flow control protocol may have the purpose of determining a desired transmission rate in the flow control protocol receiver and providing this information to the flow control protocol sender. The sender then enforces the requested transmission rate.

The end-to-end protocol may also be a retransmission protocol. In fact, the above mentioned examples of possible end-to-end protocols include retransmission functionalities as well. Further, the end-to-end protocol may also include flow control functionalities. In particular, if the end-to-end protocol sender is notified of a congestion in the transmission of data packets to the end-to-end protocol receiver, it may reduce its sending rate. On the other hand, if no congestions are notified for a given period of time, the end-to-end protocol sender may increase its sending rate. In this way, the end-to-end protocol may try to set a sending rate which is as high as possible, but still avoids excessive amounts of congestions.

The above mentioned examples of end-to-end protocols include corresponding flow control functionalities.

In the above-mentioned examples of end-to-end protocols, the data packets include, typically in a corresponding header field, a source address, a destination address, a source port, and a destination port. On the basis of the source address, the destination address, the source port, and the destination port, an IP packet flow can be defined as a data flow of IP packets between a source endpoint defined by the source address and the source port, and a destination endpoint defined by the destination address and the destination port. Typically, not all nodes in the communication network 1 as illustrated in FIG. 1 will have access to this end-to-end protocol information. For example, nodes in the transport network 9 as illustrated in FIG. 1 may operate on information of lower protocol layers only, e.g. on the basis of a low layer transport protocol as specified in the 3GPP technical specifications for the Iub transport network (see, e.g., 3GPP technical specification 25.430), and therefore not be able to interact with a flow-control mechanism of the end-to-end protocol. On the other hand, the control node 5, in the illustrated example an RNC, operates on the basis of the end-to-end protocol as well and can use the information in the header fields of the data packets so as to identify individual flows. Since the control node 5 is arranged between the source and destination endpoints of the end-to-end protocol flows, it may also be referred to as an intermediate node.

Figure 2:
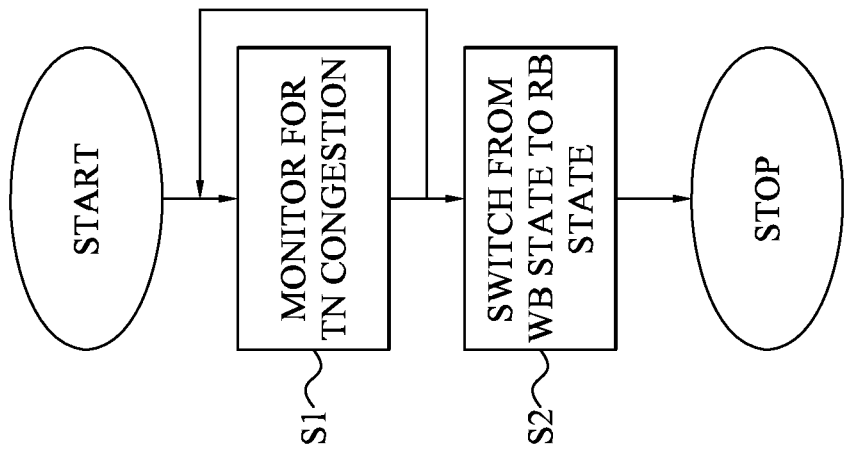
FIG. 2 is a flow diagram illustrating a method for congestion control according to an embodiment.

FIG. 2 is a flow diagram illustrating a method of congestion control in a communication network, such as the communication network of FIG. 1, having a transport network interconnecting a radio access node and a control node. The method starts in step S1, which involves monitoring for a congestion event in the transport network (TN). The monitoring for TN congestion is advantageously continuously active and could conduct a detection of any TN congestion upon predefined triggering events. For instance, a detection of any TN congestion could be conducted whenever a data packet or data frame of a given data flow arrives at a receiving node, typically the radio access node. In such a case, step S1 preferably involves an individual monitoring for TN congestion for each data flow between the sending node, typically the control node, and the receiving node, typically the radio access node. In a typical implementation, there is a one-to-one relationship between data flow and bearer between the control node or the SGSN/UMSC and the user equipment. Hence, the monitoring of step S1 is preferably conducted individually for each active bearer, also denoted radio access bearer (RAB) for an UMTS implementation. Generally a bearer can be considered to be a channel having certain guaranteed transport attributes, such as with regard to quality of service (QoS).

If the monitoring detects a congestion event in the transport network for at least one bearer or data flow, the method continues from step S1 to step S2. Step S2 switches operation state from a window-based (WB) state to a rate-based (RB) state. The window-based state and the rate-based state are characterized by utilizing different congestion control modes or techniques. Thus, the window-based state, which could be regarded as the default state, implements a window-based congestion control mode for a data flow or bearer. The window-based congestion control mode involves notifying the application level protocol, such as TCP, implemented in the data sending source or device, such as an end device of FIG. 1, of any congestion event. The application level protocol in the data sending source is then informed of the congestion event and will take actions to combat the detected congestion event, which is further described herein.

The rate-based state, which correspondingly could be regarded as an auxiliary state, instead implements a rate-based congestion control mode for the data flow. In the rate-based congestion control mode the radio access node will transmit a rate-reducing message to the control node in response to a detected congestion event in the transport network. The rate-reducing message triggers the control node to reduce the bitrate of the data flow or bearer towards the radio access node to combat the detected congestion event.

Hence, the congestion control is a multi-mode congestion control that provides different congestion control solutions and techniques depending on in which state the transport network is for a particular data flow and bearer. The state switching is preferably conducted per-flow or per-bearer basis. This implies that for a particular transport network and at a particular time instance, the window-based state could be employed for at least one data flow between the control node and the radio access node whereas for at least one other parallel data flow the rate-based state could be currently used. This means that any state transitions for multiple parallel data flows do not necessarily have to be synchronized. However, if multiple data flows go through a same transport network bottleneck then TN congestion will probably be detected for all these data flows in step S1 and cause a switch from the window-based state to the rate-based state for all the data flows. The individual monitoring and state-transitions are, though, preferred since situations can arise where only some of the data flows have a TN bottleneck, i.e. some data flows go through an Iur bottleneck, whereas other data flows do not.

The rate-based congestion control mode that is employed in the rate-based congestion state is well designed to handle congestion in the transport network and still achieves fairness among the data flows in the transport network. Thus, the rate-based congestion control mode will efficiently solve the congestion situation but can perform this and still provide a fair share of the scarce transmission resources and bandwidth in the transport network among the current data flows and user equipment.

However, the rate-based congestion control mode responds comparatively slower to congestion events as compared to the window-based congestion mode employed in the window-based state. Hence, the window-based congestion mode is, according to the embodiments, employed to handle, in the window-based state, any congestion events occurring on the air interface between the radio access node and the user equipment. The air interface capacity may vary very fast and this can be a challenge to a rate-based congestion control mode if it would have been employed to combat congestion on the air interface. The window-based congestion control mode of the embodiments can respond comparatively much faster as compared to the rate-based congestion control mode to congestion events on the air interface. This means that in the window-based state employing the window-based congestion control mode, the transport network will be ready to efficiently handle any detected congestion events on the air interface.

In the window-based state, fairness among the data flows and user equipment can be handled by the scheduler of the radio access node assigning transmission or radio resources and bandwidth shares to the different data flows and user equipment.

However, the window-based congestion control mode would have had drawbacks if employed in the rate-based state in order to handle congestion events in the transport network with regard to achieving fairness among the data flows and the user equipment. In such a case, a window-based congestion control mode would have needed to employ aggregated solutions in order to share the available bandwidth among the data flows in a fair manner. However, an aggregated solution requires detailed information of the transport network bottlenecks and quality of service (QoS) solutions. Additionally, it has to support aggregated transport network connections, where data flows of several radio access nodes can experience bottlenecks. However, such an aggregated solution is very complex and will be less flexible and could work in a non-optimal way for practical transport network architectures.

Figure 3:
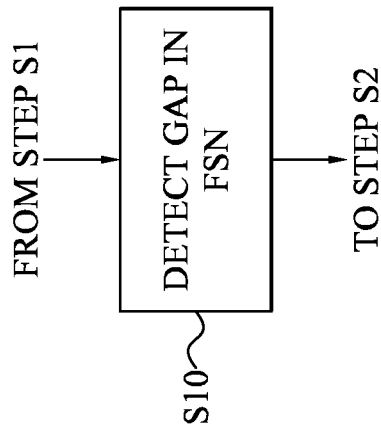
FIG. 3 is a flow diagram illustrating an additional step of the method for congestion control in FIG. 2 according to an embodiment.

FIG. 3 is a flow diagram illustrating an additional step of the method in FIG. 2. In this step S10, the TN congestion event is detected based on a gap in frame sequence numbers or packet sequence numbers of data frames or data packets in the data flow from the control node to the radio access node. In such a case, at least one or more data packets or data frames do not successfully reach the radio access node due to the congestion in the transport network. For instance, the high-speed downlink shared channel (HS-DSCH) Iub data frames each comprise a 4-bit frame sequence number (FSN). This FSN can be used to detect missing data frames, which were fully lost in the data flow between the control node and the radio access node. In addition, or in alternative embodiments, a data packet or data frame does not necessary have to be fully lost in order to detect a congestion event in the transport network. A data frame or data packet could be regarded as not being successfully received at the radio access node, for instance by being received corrupted. Such a packet or frame corruption can also be used as a criterion for detecting congestion in the transport network. For instance a data frame could be segmented into multiple parts and one or more of these parts can be lost or corrupted. When the segmented data frame is reassembled it is possible to detect that a part of the data frame was lost.

A further variant to detect a congestion event in the transport network on the basis of one or more data packets or data frames of the data flow is to use the optional delay reference time (DRT) field in the data frame. The DRT field contains the value of a reference counter in the control node, when the data frame was sent. The DRT value can then be compared to a similar reference counter in the radio access node when the data frame is received. Congestion is then detected when the difference is larger than a defined threshold value.

Other variants to detect congestion in the transport network is to use transport network protocol specific fields, such as the explicit congestion notification (ECN) field that is present in the IP header. Also the transport network layer (TNL) buffer length and data frame rate measurements can be used to detect congestion in the transport network. For instance and with reference to FIG. 1, the transport network 9 can comprise one or more data queues 90 comprising data packets to be communicated between the control node 5 and the radio access node 4. Congestion in the transport network 9 can then be detected based on a queuing parameter associated with the data queue 90. The queuing parameter can be the filling level of the data queue 90 and/or the queuing delay for the data queue 90. Thus, if the current filling level exceeds a threshold filling level and/or the current queuing delay exceeds a threshold delay, a TN congestion is detected.

Once a congestion event in the transport network has been detected according to any of the above illustrative examples of congestion criteria, such as based on gap in FSN as in step S10, the method continues to step S2 of FIG. 2, where a switch from the window-based state to the rate-based state is performed.

Figure 4:
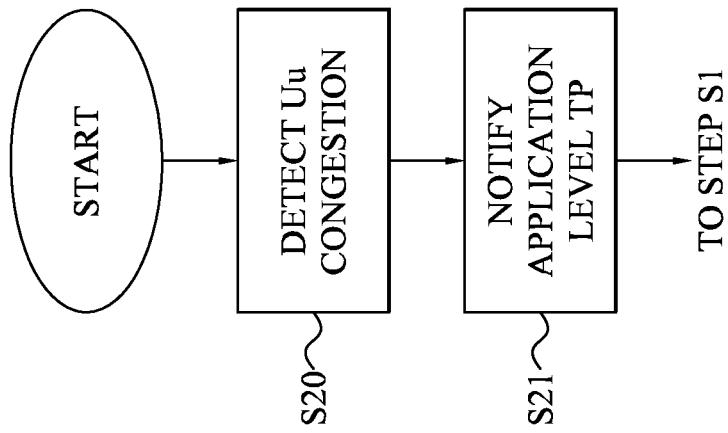
FIG. 4 is a flow diagram illustrating additional steps of the method for congestion control in FIG. 2 according to an embodiment.

When a particular data flow or bearer currently is in the window-based state, i.e. the default congestion control state, the embodiments advantageously also monitor for congestion on the air interface between the radio access node and the user equipment. FIG. 4 is a flow diagram illustrating such congestion monitoring according to an embodiment. The method then starts in step S20 where monitoring for congestion on the air interface, such as the Uu interface for an UMTS implementation, is conducted for a data flow or bearer when in the window-based state. In step S20 an Uu congestion, i.e. congestion on the air interface to the user equipment, is detected.

In an embodiment of step S20, the Uu congestion event is detected based on a length of a data queue 42, 43, typically denoted priority queue (PQ) in the art, assigned to the particular data flow and therefore for the user equipment 2, 3 in the radio access node 4, see FIG. 1. Thus, the filling level of the data queues 42, 43 in the radio access node 4 containing downlink data intended to the user equipment 2, 3 is preferably monitored in order to detect a potential Uu congestion when the filling level of a data queue 42, 43 exceeds a threshold filling level. Also other queuing parameters of a data queue 42, 43 to which data packets are assigned before being transmitted via the radio link 10 to the respective user equipment 2, 3 can be used to detect the Uu congestion. An example of such another queuing parameter, in addition to filling level of the data queue 42, 43, is the queuing delay of the data queue 42, 43. Thus, if the queuing delay exceeds a threshold delay, a Uu congestion event is detected.

The method then continues from step S20 to step S21 when a Uu congestion event has been detected. In the window-based state the previously mentioned window-based congestion control mode is employed to combat the detected congestion event. This implies that the application level transport protocol, such as TCP, in the data sending node is notified of the congestion event on the air interface. The congestion control will then be handled and resolved by this application level transport protocol.

In an embodiment of step S21, the notification of the application level transport protocol is performed by employing a so-called active queue management (AQM). The transport network node, i.e. control node or typically the radio access node, detecting the congestion event on the air interface can use AQM to drop at least one data packet, typically an application level data packet of the data flow associated with and carrying data originating from the data sending source. Dropping at least one application level data packet of the data flow can be affected by dropping at least one data packet in a data queue 52, 53 assigned to the data flow in the control node 5 and/or by not entering at least one data packet in the data queue 52, 53 assigned to the data flow. In a particular embodiment, the data packet at the head of the data queue 52, 53 is dropped in order to reduce the time up to when the application level transport protocol implemented in the data sending source 7, 8 is notified of the congestion event and can take congestion combating actions.

If the Uu congestion monitoring is conducted in the radio access node 4 based on a queuing parameter of the data queues 42, 43 in the radio access node 4, the radio access node 4 preferably informs the control node 5 of the detected Uu congestion, such as using the Iub FP protocol, to trigger the control node 5 to drop at least one application level data packet, such as RLC service data unit (SDU) in the data queue 52, 53 assigned to the relevant data flow.

Dropping at least one application level data packet implies that the data sending source will become aware of the Uu congestion due to the failure to receive an acknowledgement for the dropped data packet(s). Thus, the application level transport protocol between the sending source, i.e. one of the end devices 7, 8 in FIG. 1, and the receiving source, i.e. one of the user equipment 2, 3, employ ACK/NACK signaling to indicate successful or not successful reception of the transmitted data packets. Dropping at least one application level data packet means that the user equipment 2, 3 will not generate and send any ACK for that data packet to the end device 7, 8. The application level transport protocol implemented in the end device 7, 8 is thereby informed that at least one data packet was not successfully received by the user equipment 2, 3 due to the detected congestion event. The sending source, i.e. end device 7, 8, will react to the congestion event by, for instance, reducing the sending rate of data packets in the data flow towards the user equipment. This will in turn be beneficial from congestion solving point of view since the rate of new data packets of the data flow entering the data queue 42, 43 assigned to the data flow in the radio access node 4 will be reduced, in turn contributing to a lowering of the filling level and/or queuing delay of the data queue 42, 43.

In the above described embodiment, a next possible data packet, such as SDU, is preferably dropped from the data queue assigned to the data flow in the control node. An alternative that even further speeds up the time until the application level transport protocol in the data sending source is informed of the congestion event is to discard a current data packet, such as SDU, in the user equipment. For instance, once the control node is informed of the detected Uu congestion, typically by the radio access node, it can send a RLC status packet data unit (PDU) or packet to the user equipment with a move receiver window (MRW) command. The super field (SUFI) in the RLS status PDU can be used for this command. The MRW command will trigger the user equipment to discard the latest unacknowledged RLC SDU of the data flow. No ACK will thereby be sent to the data sending source with regard to the dropped data packet and the application level transport protocol implemented in the data sending source can thereby solve the congestion event by reducing the sending rate of data packets for the relevant data flow.

In addition, if the control node does not receive any ACK from the user equipment for the transmitted MRW command as monitored by the RLC function in the control node, the control node can drop the next possible data packet, such as SDU, from the data queue assigned to the data flow in the control node as in above. This makes the method more robust and provides a fallback solution.

Instead of dropping at least one application level data packet, the application level transport protocol implemented in the data sending source can be informed of the detected Uu congestion by manipulating the content of at least one application level data packet of the data flow associated with the data sending source. For instance, a data packet in a data queue assigned to the data flow in the control node or a data packet to be entered in the data queue can be marked with a congestion indicator. For instance, an explicit congestion notification (ECN) flag can be set in the data packet. Such a flag is also denoted ECN congestion experience (ECN-CE) flag in the art. The application level transport protocol can then be informed of the congestion event from such a flag.

A further variant of manipulating the content of at least one application level data packet to inform the application level transport protocol of the congestion event is to alter one or more bits in the data packet, preferably in the SDU payload of a RLC data packet or a so-called medium access control— dedicated (MAC-d) PDU. An example would be to alter the last bit of the SDU payload. In such a case, the RLC header is preferably left intact or unchanged. In such a case, the manipulated RLC data packet is considered valid on RLC protocol level but corrupt on transport protocol, such as TCP, level. The user equipment will then identify that the data packet has been manipulated and is corrupt when performing an error detection on the received data packet, such as a cyclic redundancy check (CRC). The user equipment then discards the manipulated received data packet and will not return any ACK with regard to the data packet to the data sending source. The application level transport protocol in the data sending source is thereby informed of the congestion event and can respond by reducing the sending rate of data packets for the particular data flow as discussed above. By preferably keeping the RLC header intact in the manipulation RLC retransmission of the data packet is avoided, which is advantageous to reduce unnecessary data traffic in the congestion situation.

The manipulation can be conducted on at least one data packet in the data queue assigned to the particular data flow in the radio access node or in the data queue assigned to the data flow in the control node or to at least one data packet to be entered in any of these data queues. The data packet to be manipulated is preferably the data packet in the head of the data queue assigned to the data flow in the radio access node to speed up the time until the application level transport protocol implemented in the data sending source is informed of the congestion event.

Regardless of which embodiment that is employed in step S21 to notify the application level transport protocol of the congestion event on the air interface, the method then continues to step S1 of FIG. 2 to indicate that the current state for the data flow is the window-based state.

Figure 5:
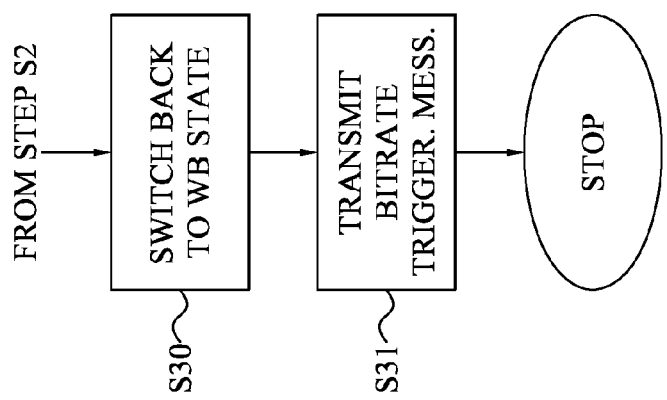
FIG. 5 is a flow diagram illustrating additional steps of the method for congestion control in FIG. 2 according to an embodiment.

FIG. 5 is a flow diagram illustrating additional steps of the method in FIG. 2. The method continues from step S2 of FIG. 2 and continues to step S30. Step S30 switches back from the rate-based state to the window-based state for the current data flow. This state re-switching can be triggered according to different criteria. In an embodiment, the detection of the TN congestion and the switch from the window-based state to the rate-based state in step S2 starts a timer. The switch back to the window-based state is initiated following lapse of a predefined period of time after the detected congestion event in the transport network and the switch from the window-based to the rate-based state as determined based on the timer. The predefined period of time is then advantageously set to not switch back too early before the congestion event in the transport network have been solved by the rate-based congestion control mode. However, the predefined period of time is preferably not too long either to run the risk of a subsequent congestion event in the air interface when still being in the rate-base state. The predefined period of time can be set by the operator of the transport network based on statistics with regard to the durations of TN congestions and frequency of Uu congestions.

In an alternative, generally more conservative approach the switch back to the window-based state is initiated when the bitrate of the data flow is equal to or exceeds a predefined bitrate threshold. This implies that when the congestion event has been combated and the bitrate of the data flow once more can be increased back to or towards "normal" rate values, the rate-based state can be left and instead switched to the window-based state. The predefined bitrate threshold could, for instance, be the maximum possible bitrate supported by the bearer for the particular data flow, which is typically limited by the user equipment capability, subscription, etc.

In an optional approach, the method continues from step S30 to step S31 that notifies the control node of the switch back from the rate-based state to the window-based state. This notification can be performed by transmitting a message from the radio access node to the control node to trigger the control node to use a target bitrate for the data flow. For instance, the radio access node can use capacity allocation (CA) control frame (CF), such as HS-DSCH CA CF, to control the data flow from the control node. The radio access node then advantageously sets a high bitrate as the target bitrate, i.e. a bitrate that is higher than what is employed by the control node during a TN congestion period. The control node will then be informed by this comparatively high CA bitrate that the TN congestion event has ended and that a switch back to the window-based has been performed for the data flow.

Figure 6:
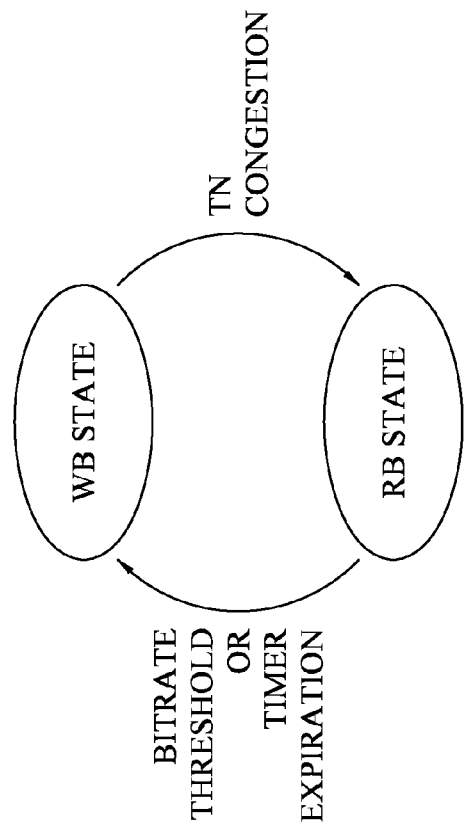
FIG. 6 schematically illustrates the concept of switching between a window-based state and rate-based state according to an embodiment.

FIG. 6 visually illustrates the states of congestion control for the multi-mode technique of the embodiments. A particular data flow and bearer and is generally started in the window-based state but will transit and switch to the rate-based state upon detection of a TN congestion. The rate-based state is then kept until a switch back to the window-based state upon timer expiration or current bitrate of the data flow is equal to or exceeds the bitrate threshold.

Figure 7:
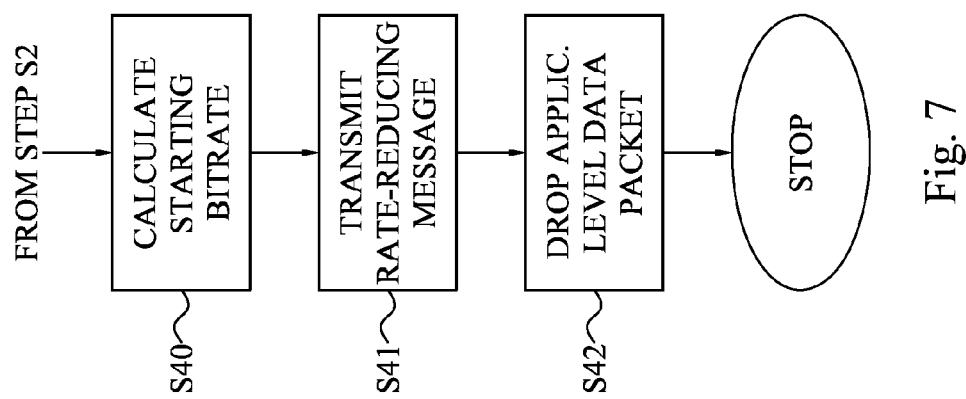
FIG. 7 is a flow diagram illustrating additional steps of the method for congestion control in FIG. 2 according to an embodiment.

FIG. 7 is a flow diagram illustrating additional steps of the method in FIG. 2 disclosing preferred operation steps during the rate-based state. The method continues from step S2 in FIG. 2. A next step S40 calculates a starting bitrate for the data flow from the control node towards the radio access node in the rate-based state. This starting bitrate is a bitrate that the control node should start with for the current data flow in order to combat the TN congestion in the rate-based state. Thus, the starting bitrate is typically lower than a current bitrate employed by the control node for the data flow. By lowering the current bitrate down to the starting bitrate the rate at which data packets of the data flow are sent from the data queue(s) in the control node to the data queue(s) in the radio access node will be reduced. This effectively combats the congestion situation in the transport network.

The starting bitrate is preferably calculated in step S40 based on current bitrates of ongoing data flows from the control node towards the radio access node. In addition, the starting bitrate is advantageously also calculated based on the respective service class assigned to the ongoing data flows. For instance, each Iub/Iur FP data frame (DF) flow between the control node and the radio access node has a current Iub FP DF bitrate and service class. Inclusion of service class information in the shaping of bitrates contributes to that fairness can be maintained between parallel data flows. Assume for instance a transport network with three parallel data flows, one data flow associated with a premium client having a premium service class and two data flows associated with different regular clients having a regular service class but all three data flows have the same bitrate before any TN congestion. If the three data flows go though the same TN bottleneck with TN congestion, the rate-based state will be employed for the three data flows. In such a case, a reduction in the bitrates could be necessary to combat the TN congestion. However, the amount of bitrate reduction could be different for the three data flows in order to reflect that the data flows belong to different service classes. For example, the bitrate of the two data flows with regular service class could be halved whereas the bitrate for the data flow with premium service class could then be reduced by merely one fourth.

Thus, the bitrate reduction by defining different starting bitrates for the relevant data flows can be made with regard to the service classes of the data flows to thereby achieve a fairness among the user equipment reflecting their different service classes.

The radio access node then transmits a rate-reducing message comprising information of the calculated starting bitrate to the control node in step S41. The control node will thereby adjust the bitrate of the data flow based on the received information.

In connection with an UMTS-implementation, the radio access node can transmit a HS-DSCH CA CF defining HS-DSCH Credits, HS-DSCH Interval and HS-DSCH Repetition Period values. These values are employed by the shaping functionality of the control node to ensure that within a given Interval not more than Credits PDUs are sent to the radio access node. Repetition Period defines how many times the Interval and the Credits are repeated. Such an HS-DSCH CA CF is an example of a rate-reducing message according to the embodiments.

In the rate-based state the bitrate shaping of the data flows can be according to an additive increase multiple decrease (AIMD) policy. Practically this means that when TN congestion is detected causing a switch from the window-based state to the rate-based state the bitrate(s) of the relevant data flow(s) is(are) decreased multiplicatively. When there is no congestion anymore the bitrate(s) is(are) additively increased.

In an optional embodiment, congestion monitoring on the air interface is performed also during the rate-based state. Then, if congestion on the air interface is detected in the rate-based state various actions can be taken. For instance, AQM actions can be taken to combat the congestion event.

The AQM action is basically performed as previously described in connection with FIG. 4. Thereby, the application level transport protocol implemented in the data sending source will be notified about the congestion event on the air interface in similarity to when operating in the window-based state. The difference, though, is that in the rate-based state the control node employs a shaping of data flows by affecting their bitrates based on feedback data from the radio access node. In an alternative approach, the application level transport protocol in the data sending source will not be informed of the detected congestion event on the air interface in the rate-based state. Instead, the shaping of bitrates for the data flows performed according to the rate-based congestion control mode is regarded to be sufficient to handle also the congestion event on the air interface occurring during the rate-based state.

The next optional step S42 can actually inform the application level transport protocol in the data sending source of the detected TN congestion event. In such a case, any of the techniques discussed above in connection with the window-based state can be used in the rate-based state to inform the application level transport protocol of the congestion. For instance, at least one application level data packet of the data flow can be dropped to signal the detected TN congestion event and cause the application level transport protocol to take combating actions, such as reducing its sending bitrate. In this embodiment, dual combating actions will be taken, i.e. both by shaping bitrates of the data flows in the control node and by the actions taken by the application level transport protocol.

FIG. 8 is a schematic block diagram of a congestion control device 100 according to an embodiment. The congestion control device 100 comprises an event monitor 110 configured to monitor for a congestion event in the transport network interconnecting a radio access node and a control node of a communication network. If the event monitor 110 detects such a TN congestion as previously described it notifies a mode switch 120 of the congestion control device 100. The mode switch 120 is thereby configured to switch from a window-based state providing the window-based congestion control mode to a rate-based state providing the rate-based congestion control mode in response to the TN congestion event detected by the event detector 110.

The event detector 110 is advantageously configured to detect the TN congestion event based on a gap in FSN of data frames in a data flow from the control node to the radio access node. Alternatively, or in addition, the event monitor 110 can base the congestion event detection on any of the previously discussed criteria, such as destroyed frame detection (DFD) with segmented data frames, DRT field in the data frame, ECN field, filling level of data queues in the control node and data frame rate measurements.

Correspondingly, when operating in the window-based congestion mode, the event monitor 110 is configured to detect any congestion event on the air interface between the radio access node and user equipment. The event monitor 110 preferably detects the congestion event on the air interface based on the length of a data queue assigned to the data flow and user equipment in the radio access node and in particular based on any of the previously described queuing parameters.

The congestion control device 100 preferably comprises a data packet modifier 130 configured to notify the application level transport protocol implemented in a data packet sending source for the data flow of the detected congestion event on the air interface. The data packet modifier 130 could then conduct this notification by dropping at least one application level data packet of the data flow, such as in a data queue assigned to the data flow in the control node.

Alternatively, or in addition, the data packet modifier 130 composes and transmits a RLC status packet to the user equipment with a MRW command to trigger dropping of at least the latest unacknowledged data packet in the user equipment.

In a further embodiment, the data packet modifier 130 manipulates the content of at least one application level data packet, for instance by altering at least one bit in the data packet as previously described.

The congestion control device 100 optionally comprises a bitrate calculator 140 configured to calculate a starting bitrate for the data flow following the switch from the window-based state to the rate-based state. The bitrate calculator 140 advantageously calculates the starting bitrate as previously discussed based on current bitrates of ongoing data flows from the control node towards the radio access node and preferably based on respective service classes of the ongoing data flows. The bitrate calculator 140 advantageously employs an AIMD policy for defining the starting bitrates to achieve fairness among the user equipment and data flows with regard to the limited transmission resources and bandwidth in the transport network. An optional control node interface 150 informs the control node of the calculated starting bitrate by transmitting a rate-reducing message comprising information of the starting bitrate to the control node.

As previously discussed, when operating in the rate-based state the congestion control device 100 can use the data packet modifier 130 to drop at least one application level data packet to achieve AQM and reduce the risk of queue overflows in the radio access node and also to combat any congestion events detected on the air interface.

The mode switch 120 is preferably further configured to switch back from the rate-based state to the window-based state when a re-switching criterion is met. The re-switching criterion could be the lapse of a predefined period of time following the event monitor 110 detecting the TN congestion event and the mode switch 120 switching to the rate-based state. Another alternative is to switch back to the window-based state when the bitrate of the data flow has at least reached a predefined bitrate threshold.

The optional control node interface 150 is, in this embodiment, configured to notify the control node of the switch back from the rate-based state to the window-based state by transmitting a message to the control node triggering the control node to use a target bitrate for the data flow. The target bitrate is thereby selected to be adapted and suitable for a non-congestion case.

The congestion control device could be implemented at least partly in software. FIG. 9 is a schematic block diagram of the congestion control device implemented as a computer program product comprising computer program code means for executing the functions of the congestion control device when the computer program code means are run by a data processor 160, which can be a general purpose or specially adapted computer, processor or microprocessor. The computer program product is stored on a computer readable medium, represented by a memory 170 in the figure.

The software includes computer program code elements or software code portions effectuating the operation of at least the event monitor 110, the mode switch 120, and optionally of the data packet modifier, the bitrate calculator and the control node interface. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server or network node. The software may thus be loaded into the operating memory of a computer or equivalent processing system for execution by a processor. The computer/processor does not have to be dedicated to only execute the above-described functions but may also execute other software tasks. A non-limiting example of program code used to define the congestion control device include single instruction multiple data (SIMD) code.

Alternatively the congestion control device can be implemented in hardware. There are numerous variants of circuitry elements that can be used and combined to achieve the functions of the units of the congestion control device. Such variants are encompassed by the embodiments. Particular examples of hardware implementation of the congestion control device is implementation in digital signal processor (DSP) hardware and integrated circuit technology, including both general-purpose electronic circuitry and application-specific circuitry.

The congestion control device is advantageously implemented in a network node of the communication network and in particular in a network node of the transport network. A particular embodiment of such a network node is the radio access node or Node B for an UMTS-implementation, which then comprises the congestion control device. Also distributed implementations are possible and within the scope of the embodiments. In such a case, at least some of the functions of the congestion control device are implemented in a first network node, preferably of the transport network, with remaining functions of the congestion control device implemented in at least one other network node, preferably of the transport network. This distributed implementation can be in the form of providing the functions of the congestion control device in different radio access nodes or distributed between at least one radio access node and at least one control node.

Figure 10:
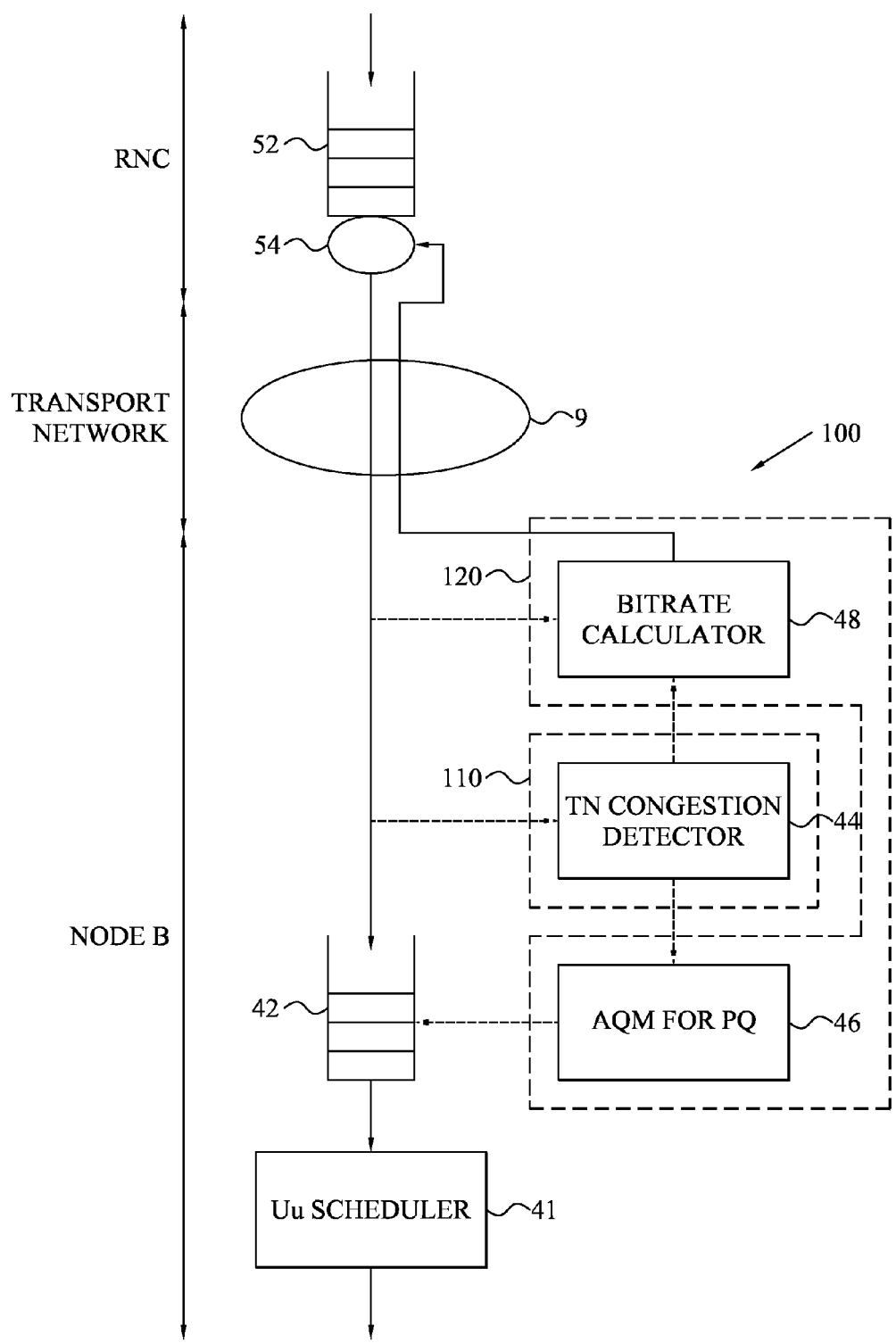
FIG. 10 schematically illustrates an implementation example of a congestion control device in a radio access node according to an embodiment.

FIG. 10 is a schematic implementation example of the congestion control device 100 provided in a Node B of an UTRAN as an example of the transport network. The RNC puts arriving MAC-d PDUs in a RLC SDU buffer 52. A shaper 54 of the RNC shapes the arriving MAC-d PDUs according to signaled maximum flow bitrate. The Iub FP puts the MAC-d PDUs into Iub FP DFs and sends them to the Node B. Each of these data frames contains a respective FSN. A TN congestion detector 44 in the Node B, implementing the functions of the event monitor 110, detects any TN congestion based on the FSN information in the received Iub FP DFs and optionally based on the length of the PQs 42 of the Node B. If TN congestion is detected, the TN congestion detector 44 signals this to a bitrate calculator 48 forming part of the mode switch 120. The bitrate calculator 120 calculates the allowed maximum bitrate at which the RNC may send data to the Node B in order to resolve the TN congestion. The bitrate calculator 48 generates and transmits a rate-reducing message through Iub FP CA CF to the shaper 54 in the RNC.

The Node B also comprises an Uu scheduler 41 that is configured to schedule transmission of data packets from the PQs 42 in the Node B to the user equipment. The mode switch 120 also comprises an AQM device for the PQ 46 that operates on data packets stored in the PQ 42, in the RLC SDU buffer 52 or in the data buffer at the user equipment as previously described. In particular, the AQM device 46 can monitor the buffer level status of the PQs arranged at the Node B and detect any congestion on the air interface based on this buffer level status. In such a case, the AQM device 46 or another device of the Node B, sends a message to trigger the shaper 54 or another device of the RNC to drop or manipulate the content of at least one data packet, such as MAC-d PDU as discussed in the foregoing.

The embodiments described above are to be understood as a few illustrative examples of the present invention. It will be understood by those skilled in the art that various modifications, combinations and changes may be made to the embodiments without departing from the scope of the present invention.

In particular, different part solutions in the different embodiments can be combined in other configurations, where technically possible. The scope of the present invention is, however, defined by the appended claims.

The invention claimed is:

1. A method for congestion control in a communication network comprising a transport network interconnecting a radio access node and a control node, said method comprising:
monitoring for a congestion event in said transport network; and
switching, in response to a detected congestion event in said transport network, from a window-based state providing a window-based congestion control mode for a data flow towards said radio access node involving notifying an application level transport protocol implemented in a data sending source associated with said data flow of any congestion event to a rate-based state providing a rate-based congestion control mode for said data flow involving said radio access node transmitting a rate-reducing message to said control node triggering a reduction in a bitrate of said data flow.

2. The method according to claim 1, further comprising detecting the congestion event in said transport network based on a gap in frame sequence numbers of data frames in said data flow received by said radio access node from said control node.

3. The method according to claim 1, further comprising:
detecting, when in said window-based state, a congestion event on an air interface to user equipment; and
notifying said application level transport protocol of said congestion event on said air interface by dropping at least one application level data packet of said data flow.

4. The method according to claim 1, further comprising:
detecting, when in said window-based state, a congestion event on an air interface to user equipment; and
notifying said application level transport protocol of said congestion event on said air interface by manipulating the content of at least one application level data packet of said data flow.

5. The method according to claim 3, wherein detecting said congestion event on said air interface comprises detecting, when in said window-based state, said congestion event on said air interface based on a length of a data queue assigned to said user equipment in said radio access node.

6. The method according to claim 1, further comprising switching back from said rate-based state to said window-based state following lapse of a predefined period of time following said detected congestion event in said transport network.

7. The method according to claim 1, further comprising switching back from said rate-based state to said window-based state when said bitrate of said data flow is equal to or exceeds a predefined bitrate threshold.

8. The method according to claim 6, further comprising notifying said control node of the switch back from said rate-based state to said window-based state by said radio access node transmitting a message triggering said control node to use a target bitrate for said data flow.

9. The method according to claim 1, further comprising:
calculating, when in said rate-based state, a starting bitrate for said data flow towards said radio access node based on current bitrates of ongoing data flows from said control node towards said radio access node and based on a respective service class assigned to said ongoing data flows; and
said radio access node transmitting, to said control node, said rate-reducing message comprising a notification of said starting bitrate.

10. The method according to claim 1, further comprising dropping at least one application level data packet of said data flow based on said detected congestion event in said transport network.

11. A non-transitory computer readable medium comprising instructions which, when executed by a processor, cause the processor to perform a method for congestion control in a communication network comprising a transport network interconnecting a radio access node and a control node, said method comprising:
monitoring for a congestion event in said transport network; and
switching, in response to a detected congestion event in said transport network, from a window-based state providing a window-based congestion control mode for a data flow towards said radio access node involving notifying an application level transport protocol implemented in a data sending source associated with said data flow of any congestion event to a rate-based state providing a rate-based congestion control mode for said data flow involving said radio access node transmitting a rate-reducing message to said control node triggering a reduction in a bitrate of said data flow.

12. A congestion control device comprising:
an event monitor configured to monitor for a congestion event in a transport network interconnecting a radio access node and a control node of a communication network; and
a mode switch configured to switch, in response to a congestion event in said transport network detected by said event monitor, from a window-based state providing a window-based congestion control mode for a data flow towards said radio access node involving notifying an application level transport protocol implemented in a data sending source associated with said data flow of any congestion event to a rate-based state providing a rate-based congestion control mode for said data flow involving said radio access node transmitting a rate-reducing message to said control node triggering a reduction in bitrate of said data flow.

13. The device according to claim 12, wherein said event monitor is configured to detect the congestion event in said transport network based on a gap in frame sequence numbers of data frames in said data flow received by said radio access node from said control node.

14. The device according to claim 12, wherein said event monitor is configured to detect, when in said window-based state, a congestion event on an air interface to user equipment, said congestion control device comprises a data packet modifier configured to notify said application level transport protocol of said congestion event on said air interface by dropping at least one application level data packet of said data flow.

15. The device according to claim 12, wherein said event monitor is configured to detect, when in said window-based state, a congestion event on an air interface to user equipment, said congestion control device comprises a data packet modifier configured to notify said application level transport protocol of said congestion event on said air interface by manipulating the content of at least one application level data packet of said data flow.

16. The device according to claim 14, wherein said event monitor is configured to detect, when in said window-based state, said congestion event on said air interface based on a length of a data queue assigned to said user equipment in said radio access node (4).

17. The device according to claim 12, wherein said mode switch is configured to switch back from said rate-based state to said window-based state following lapse of a predefined period of time following said event monitor detecting said congestion event in said transport network.

18. The device according to claim 12, wherein said mode switch is configured to switch back from said rate-based state to said window-based state when said bitrate of said data flow is equal to or exceeds a predefined bitrate threshold.

19. The device according to claim 17, further comprising a control node interface configured to notify said control node of the switch back from said rate-based state to said window-based state by transmitting a message triggering said control node to use a target bitrate for said data flow.

20. The device according to claim 12, further comprising:
   a bitrate calculator configured to calculate, when in said rate-based state, a starting bitrate for said data flow towards said radio access node based on current bitrates of ongoing data flows from said control node towards said radio access node and based on a respective service class assigned to said ongoing data flows; and
   a control node interface configured to transmit, to said control node, said rate-reducing message comprising a notification of said starting bitrate.

21. The device according to claim 12, further comprising a data packet modifier configured to drop at least one application level data packet of said data flow based on said congestion event in said transport network detected by said event monitor.

22. A radio access node comprising a congestion control device including:
   an event monitor configured to monitor for a congestion event in a transport network interconnecting a radio access node and a control node of a communication network; and
   a mode switch configured to switch, in response to a congestion event in said transport network detected by said event monitor, from a window-based state providing a window-based congestion control mode for a data flow towards said radio access node involving notifying an application level transport protocol implemented in a data sending source associated with said data flow of any congestion event to a rate-based state providing a rate-based congestion control mode for said data flow involving said radio access node transmitting a rate-reducing message to said control node triggering a reduction in bitrate of said data flow.

\* \* \* \* \*